United States Patent [19]

Dyllick-Brenzinger et al.

[11] Patent Number: 5,205,838
[45] Date of Patent: Apr. 27, 1993

[54] LIQUID DYE PREPARATIONS: BIS PHENYL-AZO-RESORCINOL IN SOLVENT FOR COLORED RIBBON OR BALL PEN INK

[75] Inventors: Rainer Dyllick-Brenzinger, Weinheim; Heinz Hartmann, Bobenheim; Helmut Bellaire, Ludwigshafen; Georg Zeidler, Dannstadt-Schauernheim, all of Fed. Rep. of Germany

[73] Assignee: BASF Aktiengesellschaft, Ludwigshafen, Fed. Rep. of Germany

[21] Appl. No.: 825,377

[22] Filed: Jan. 24, 1992

[30] Foreign Application Priority Data

Feb. 25, 1991 [DE] Fed. Rep. of Germany ....... 4105866

[51] Int. Cl.$^5$ .................. B41M 5/03; C09B 33/02; C09B 67/36; C09D 11/16
[52] U.S. Cl. .................................... 8/527; 8/506; 8/521; 8/522; 8/583; 8/611; 8/614; 8/617; 8/673; 8/687; 106/221
[58] Field of Search ...................... 8/527, 528, 687

[56] References Cited

U.S. PATENT DOCUMENTS

| | | | |
|---|---|---|---|
| 3,476,500 | 11/1969 | Litke | 8/524 |
| 4,082,501 | 4/1978 | Mees et al. | 8/639 |
| 4,521,216 | 6/1985 | Armbrust et al. | 8/639 |
| 4,612,015 | 9/1986 | Dyllick-Brenzinger | 8/527 |

FOREIGN PATENT DOCUMENTS

58-173171 10/1983 Japan .

OTHER PUBLICATIONS

Chemical Abstracts, 176656r, vol. 100, No. 22, May 1984, & JP 58,173,171, Oct. 12, 1983, K.K. Canon, "Liquid for Ink-Jet Recording".

*Primary Examiner*—A. Lionel Clingman
*Attorney, Agent, or Firm*—Oblon, Spivak, McClelland, Maier & Neustadt

[57] ABSTRACT

Liquid dye preparations useful for making color ribbons or ballpoint pen pastes contain at least one dye of the formula

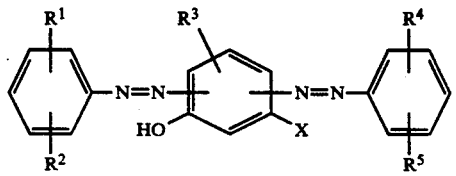

where X is hydroxyl, amino or $C_1$–$C_{15}$-monoalkylamino, $R^1$ and $R^4$ are each a carboxylate group or substituted or unsubstituted $C_1$–$C_{15}$-alkoxy, $R^2$ and $R^5$ are each hydrogen, nitro or chlorine, and $R^3$ is hydrogen or $C_1$–$C_{13}$-alkyl, plus as solvent at least one product selected from the group consisting of benzyl alcohol, tridecanol, isotridecanol, glycol ethers, olein, dialkyl phthalates, chloroalkanes, alkanes disubstituted by phenyl, dialkylnaphthalenes and partly hydrogenated terphenyl.

9 Claims, No Drawings

LIQUID DYE PREPARATIONS: BIS PHENYL-AZO-RESORCINOL IN SOLVENT FOR COLORED RIBBON OR BALL PEN INK

The present invention relates to novel liquid dye preparations containing at least one dye of the formula I

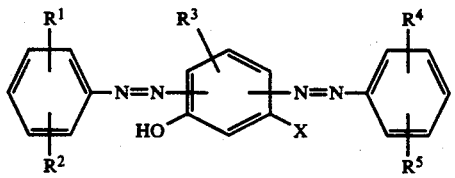

where
X is hydroxyl, amino or $C_1$–$C_{15}$-monoalkylamino,
$R^1$ and $R^4$ are identical or different and each is independently of the other $C_1$–$C_{15}$-alkoxycarbonyl, wherein the alkyl group can be interrupted by from 1 to 3 oxygen atoms in ether function, a radical of the formula

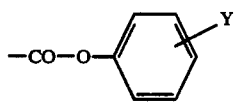

where Y is $C_1$–$C_{13}$-alkyl, which can be interrupted by from 1 to 3 oxygen atoms in ether function, or $C_1$–$C_{15}$-alkoxy, which can be interrupted by from 1 to 3 oxygen atoms in ether function,
$R^2$ and $R^5$ can be identical or different and each is independently of the other hydrogen, nitro or chlorine, and
$R^3$ is hydrogen or $C_1$–$C_{13}$-alkyl, plus as solvent at least one product selected from the group consisting of benzyl alcohol, tridecanol, isotridecanol, glycol ethers, olein, $C_1$–$C_{13}$-dialkyl phthalates, $C_5$–$C_{30}$-chloroalkanes, $C_1$–$C_{20}$-alkanes disubstituted by phenyl, $C_1$–$C_{10}$-dialkylnaphthalenes and partly hydrogenated terphenyl and to the use of the novel dye preparations for manufacturing color ribbons or ballpoint pen pastes.

EP-A-167 974 discloses liquid dye preparations which contain organic carbonates, e.g. propylene carbonate, as solvent. However, it has been found that these preparations are not very suitable for manufacturing color ribbons or ballpoint pen pastes.

It is an object of the present invention to provide novel liquid dye preparations for which the dyes used shall be disazo dyes having a coupling component of the resorcinol or aminophenol series. The novel preparations shall be advantageous for manufacturing color ribbons or ballpoint pen pastes.

We have found that this object is achieved by the liquid dye preparations defined at the beginning.

Any alkyl appearing in the abovementioned formula I may be either straight-chain or branched.

(The terms isooctyl, isononyl, isodecyl and isotridecyl used hereinafter are trivial names derived from the oxo alcohols (cf. Ullmanns Encyklopadie der technischen Chemie, 4th edition, volume 7, pages 215 to 217, and also volume 11, pages 435 and 436).

X is for example methylamino, ethylamino, propylamino, isopropylamino, butylamino, isobutylamino, secbutylamino, pentylamino, isopentylamino, neopentylamino, hexylamino, heptylamino, octylamino, isooctylamino, 2-ethylhexylamino, nonylamino, isononylamino, decylamino, isodecylamino, undecylamino, dodecylamino, tridecylamino, isotridecylamino, tetradecylamino or pentadecylamino.

$R^1$ and $R^4$ are each for example methoxycarbonyl, ethoxycarbonyl, propoxycarbonyl, isopropoxycarbonyl, butoxycarbonyl, isobutoxycarbonyl, sec-butoxycarbonyl, pentyloxycarbonyl, isopentyloxycarbonyl, neopentyloxycarbonyl, tert-pentyloxycarbonyl, hexyloxycarbonyl, heptyloxycarbonyl, 1-ethylpentyloxycarbonyl, octyloxycarbonyl, isooctyloxycarbonyl, 2-ethylhexyloxycarbonyl, nonyloxycarbonyl, isononyloxycarbonyl, decyloxycarbonyl, isodecyloxycarbonyl, undecyloxycarbonyl, dodecyloxycarbonyl, tridecyloxycarbonyl, isotridecyloxycarbonyl, tetradecyloxycarbonyl, pentadecyloxycarbonyl, 2-methoxyethoxycarbonyl, 2-ethoxyethoxycarbonyl, 2-propoxyethoxycarbonyl, 2-isopropoxyethoxycarbonyl, 2-butoxyethoxycarbonyl, 2- or 3-methoxypropoxycarbonyl, 2- or 3-ethoxypropoxycarbonyl, 2- or 3-propoxypropoxycarbonyl, 2- or 3-butoxypropoxycarbonyl, 2- or 4-methoxybutoxycarbonyl, 2- or 4-ethoxybutoxycarbonyl, 2- or 4-propoxybutoxycarbonyl, 3,6-dioxaheptyloxycarbonyl, 3,6-dioxaoctyloxycarbonyl, 4,8-dioxanonyloxycarbonyl, 3,7-dioxaoctyloxycarbonyl, 3,7-dioxanonyloxycarbonyl, 4,7-dioxaoctyloxycarbonyl, 4,7-dioxanonyloxycarbonyl, 2- or 4-butoxybutoxycarbonyl, 4,8-dioxadecyloxycarbonyl, 3,6,9-trioxadecyloxycarbonyl, 3,6,9-trioxaundecyloxycarbonyl, methoxy, ethoxy, propoxy, isopropoxy, butoxy, isobutoxy, secbutoxy, pentyloxy, isopentyloxy, neopentyloxy, tertpentyloxy, hexyloxy, heptyloxy, 1-ethylpentyloxy, octyloxy, isooctyloxy, 2-ethylhexyloxy, nonyloxy, isononyloxy, decyloxy, isodecyloxy, undecyloxy, dodecyloxy, tridecyloxy, isotridecyloxy, tetradecyloxy, pentadecyloxy, 2-methoxyethoxy, 2-ethoxyethoxy, 2-propoxyethoxy, 2-isopropoxyethoxy, 2-butoxyethoxy, 2- or 3-methoxypropoxy, 2-or 3-ethoxypropoxy, 2- or 3-propoxypropoxy, 2- or 3-butoxypropoxy, 2- or 4-methoxybutoxy, 2- or 4-ethoxybutoxy, 2- or 4-propoxybutoxy, 3,6-dioxaheptyloxy, 3,6-dioxaoctyloxy, 4,8-dioxanonyloxy, 3,7-dioxaoctyloxy, 3,7-dioxanonyloxy, 4,7-dioxaoctyloxy, 4,7-dioxanonyloxy, 2- or 4-butoxybutoxy, 4,8-dioxadecyloxy, 3,6,9-trioxadecyloxy or 3,6,9-trioxaundecyloxy.

$R^3$ and Y are each for example methyl, ethyl, propyl, isopropyl, butyl, isobutyl, sec-butyl, pentyl, isopentyl, neopentyl, tert-pentyl, hexyl, heptyl, 1-ethylpentyl, octyl, isooctyl, 2-ethylhexyl, nonyl, isononyl, decyl, isodecyl, undecyl, dodecyl, tridecyl or isotridecyl.

Y may also be for example 2-methoxyethyl, 2-ethoxyethyl, 2-propoxyethyl, 2-isopropoxyethyl, 2-butoxyethyl, 2- or 3-methoxypropyl, 2- or 3-ethoxypropyl, 2- or 3-propoxypropyl, 2- or 3-butoxypropyl, 2- or 4-methoxybutyl, 2- or 4-ethoxybutyl, 2- or 4-propoxybutyl, 3,6-dioxaheptyl, 3,6-dioxaoctyl, 4,8-dioxanonyl, 3,7-dioxaoctyl, 3,7-dioxanonyl, 4,7-dioxaoctyl, 4,7-dioxanonyl, 2- or 4-butoxybutyl, 4,8-dioxadecyl, 3,6,9-trioxadecyl or 3,6,9-trioxaundecyl.

Olein for the purposes of the present invention is technical grade oleic acid as formed in fat separation. It may still contain minor amounts of stearic acid, palmitic acid and other fatty acids.

Suitable solvents for the dye preparations of the present invention are for example benzyl alcohol, tridecanol, isotridecanol, glycol ethers, such as 2-methoxyethanol, 2-ethoxyethanol, 2-propoxyethanol, 2-isopropoxyethanol, 2-butoxyethanol, 2-phenoxyethanol, 1,2-dimethoxyethane, 1,2-diethoxyethane, 1,2-dipropoxyethane, 1,2-diisopropoxyethane, 1,2-dibutoxyethane, 1,2-diphenoxyethane, 2- or 3-methoxypropanol, 2- or 3-ethoxypropanol, 2- or 3-isopropoxypropanol, 2- or 3-butoxypropanol, 2- or 3-phenoxypropanol, 1,2- or 1,3-dimethoxypropane, 1,2- or 1,3-diethoxypropane, 1,2- or 1,3-dipropoxypropane, 1,2- or 1,3-diisopropoxypropane, 1,2- or 1,3-dibutoxybutane or 1,2- or 1,3-diphenoxypropane, olein, $C_4$–$C_{13}$-dialkyl phthalates, such as dibutyl phthalate, diisobutyl phthalate, di-sec-butyl phthalate, dipentyl phthalate, diisopentyl phthalate, dihexyl phthalate, diheptyl phthalate, dioctyl phthalate, diisooctyl phthalate, bis(2-ethylhexyl) phthalate, dinonyl phthalate, diisononyl phthalate, didecyl phthalate, diisodecyl phthalate, diundecyl phthalate, dodecyl phthalate, ditridecyl phthalate or diisotridecyl phthalate, $C_5$–$C_{30}$-chloroalkanes, such as chloroicosane or chlorotetracosane, $C_1$–$C_{20}$-alkanes disubstituted by phenyl, such as diphenyldecane or diphenyltetradecane, $C_1$–$C_{10}$-dialkylnaphthalenes, such as diisopropylnaphthalene, partly hydrogenated terphenyl, such as compounds of the formula

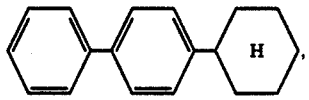,

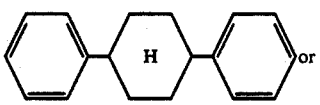 or

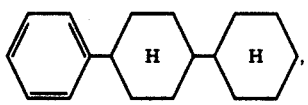, or mixtures thereof.

Preference is given to liquid dye preparations containing at least one dye of the formula Ia

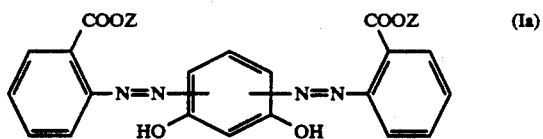 (Ia)

where Z is $C_5$–$C_{15}$-alkyl, which can be interrupted by from 1 to 3 oxygen atoms in ether function, or a radical of the formula

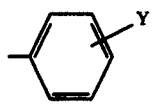

where Y is as defined above.

Preference is further given to liquid dye preparations containing from 10 to 80 % by weight, based on the weight of the preparation, of dye of the formula I.

Preference is further given to liquid dye preparations containing as solvent at least one product selected from the group consisting of benzyl alcohol, tridecanol, isotridecanol, glycol monoethers, olein, $C_4$–$C_{13}$-alkyl phthalates and $C_1$–$C_{10}$-dialkylnaphthalenes.

Particular preference is given to liquid dye preparations containing at least one dye of the formula Ia where Z is $C_8$–$C_{13}$-alkyl, in particular 2-ethylhexyl or isotridecyl.

Particular preference is further given to liquid dye preparations containing from 20 to 80% by weight, preferably from 30 to 70, in particular from 40 to 60%, by weight, each percentage being based on the weight of the preparation, of dye of the formula I.

Particular preference is further given to liquid dye preparations containing as solvent at least one product selected from the group consisting of benzyl alcohol, 2-phenoxyethanol, olein, $C_8$-dialkyl phthalate and diisopropylnaphthalene.

To prepare the dye preparations of the present invention, one or more dyes of the formula I are dissolved in the abovementioned concentration in one or more of the abovementioned solvents.

The dyes of the formula I are known per se and described for example in EP-A-91 019. They generally are yellow to red in hue.

The dye preparations of the present invention are highly stable in storage and advantageously usable for manufacturing color ribbons for matrix printers, typewriters or chain printers, or for manufacturing ballpoint pen pastes. The manufacture of color ribbons is described for example Coating 1972, 72–73, 213–214.

To achieve the important black color for color ribbons and ballpoint pen pastes, the dye preparations of the present invention are mixed with other dyes, for example with C.I. Solvent Violet 8 and C.I. Solvent Blue 4 and C.I. Solvent Black 5 or with C.I. Solvent Violet 8 and C.I. Solvent Blue 64.

A suitable black mixture for manufacturing a color ribbon contains for example
from 20 to 40 parts by weight of dye preparation of the present invention
from 20 to 35 parts by weight of C.I. Solvent Violet 8
from 5 to 15 parts by weight of C.I. Solvent Blue 4 and
from 25 to 45 parts by weight of Solvent Black 5.

To manufacture a color ribbon, this mixture is milled with mineral oils or nondrying, animal or vegetable oils such as neat's foot oil, bone oil, beet oil, groundnut oil, sperm oil, castor oil, rapeseed oil or pig fat with or without olein in a ball mill, bead mill or three-roll mill and applied to a base fabric of cotton, silk or polyamide.

A suitable black mixture for manufacturing a ballpoint pen paste contains for example
from 5 to 20 parts by weight of dye preparation of the present invention
from 5 to 15 parts by weight of C.I. Solvent Violet 8 and
from 5 to 15 parts by weight of C.I. Solvent Blue 64.

To obtain the necessary viscosity (7–20 Pas) for a ballpoint pen paste, this mixture is additionally admixed with resins, for example with acid phthalate resins or in particular with neutral aldehyde or ketone resins and also with olein or another acid.

The color ribbon inks or ballpoint pen pastes obtainable by means of the novel dye preparations have advantageous application properties. They are in particular fast to sublimation. This is virtually unattainable with the prior art dye mixtures, since their orange component is C.I. Solvent Orange 3, which sublimes readily.

The following examples further illustrate the invention:

EXAMPLE 1

50 g of the dye of the formula

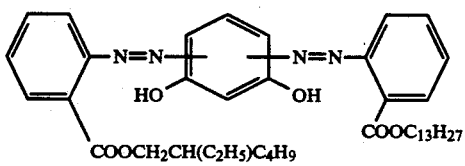

were dissolved at 90° C. in a mixture of 25 g of olein and 25 g of diisopropylnaphthalene. A stable liquid preparation was obtained.

EXAMPLE 2 a) 60 g of the dye of the formula

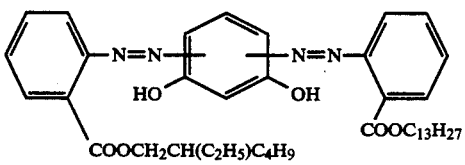

were dissolved at 90° C. in 40 g of 2-phenoxyethanol. A stable liquid preparation was obtained.

b) 15 g of the preparation described under a) were stirred up with 4 g of olein, 4 g of 1,2-propylene glycol, 33 g of acid phthalate resin (acid number: 80), 8 g of C.I. Solvent Violet 8 and 8 g of C.I. Solvent Blue 64. A sublimation-fast black ballpoint pen paste was obtained.

c) The procedure mentioned under b) was repeated, except that 33 g of a neutral ketone resin (acid number: 0) were used. Again a sublimation-fast black ballpoint pen paste was obtained.

d) The procedure mentioned under b) was repeated, except that 33 g of a neutral aldehyde resin (acid number: <3) were used. Again a sublimation-fast black ballpoint pen paste was obtained.

We claim:

1. A liquid dye preparation containing at least one dye of the formula I

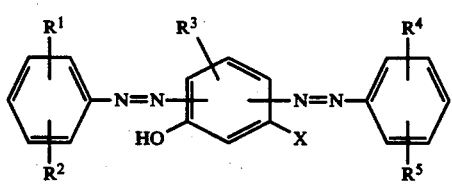

where

X is hydroxyl, amino or $C_1$–$C_{15}$-monoalkylamino, $R^1$ and $R^4$ are identical or different and each is independently of the other $C_1$–$C_{15}$-alkoxycarbonyl, wherein the alkyl group can be interrupted by from 1 to 3 oxygen atoms in ether function, a radical of the formula

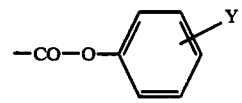

where Y is $C_1$–$C_{13}$-alkyl, which can be interrupted by from 1 to 3 oxygen atoms in ether function, or $C_1$–$C_{15}$-alkoxy, which can be interrupted by from 1 to 3 oxygen atoms in ether function, $R^2$ and $R^5$ can be identical or different and each is independently of the other hydrogen, nitro or chlorine, and $R^3$ is hydrogen or $C_1$–$C_{13}$-alkyl, plus as solvent at least one product selected from the group consisting of benzyl alcohol, tridecanol, isotridecanol, glycol ethers, olein, $C_4$–$C_{13}$-dialkyl phthalates, $C_5$–$C_{30}$-chloroalkanes, $C_1$–$C_{20}$-alkanes disubstituted by phenyl, $C_1$–$C_{10}$-dialkylnaphthalenes and partly hydrogenated terphenyl, said dye preparation containing from 10 to 80% by weight, based on the weight of the preparation, of said dye.

2. A method for manufacturing color ribbons or ballpoint pen pastes comprising using a liquid dye preparation as claimed in claim 1 in their preparation.

3. A liquid dye preparation as claimed in claim 1, containing from 20 to 80% by weight, based on the weight of the preparation, of said dye.

4. A liquid dye preparation as claimed in claim 1, containing from 30 to 70% by weight, based on the weight of the preparation, of said dye.

5. A liquid dye preparation as claimed in claim 1, containing from 40 to 60% by weight, based on the weight of the preparation, of said dye.

6. A liquid dye preparation as claimed in claim 1, wherein said solvent is selected from the group consisting of benzyl alcohol, tridecanol, isotridecanol, glycol monoether, olein, $C_4$–$C_{13}$-alkyl phthalate and $C_1$–$C_{10}$-dialkylnaphthalenes.

7. A liquid dye preparation as claimed in claim 1, wherein said solvent is selected from the group consisting of benzyl alcohol, 2-phenoxyethanol, olein, $C_8$-dialkyl phthalate and diisopropylnaphthalene.

8. A liquid dye preparation as claimed in claim 7, wherein the dye of formula (I) is a dye of the formula (Ia)

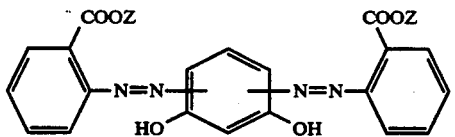

where Z is $C_5$–$C_{15}$-alkyl, which can be interrupted by from 1 to 3 oxygen atoms in ether function, or a radical of the formula

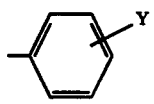

where Y is as defined in claim 1.

9. A liquid dye preparation as claimed in claim 8, wherein in the dye of formula (Ia) Z is 2-ethylhexyl or isotridecyl.

* * * * *